Feb. 28, 1961 R. L. TRENT 2,973,440

DIRECT-CURRENT LEVEL CONTROL IN PULSE TRANSMISSION

Filed March 18, 1957

2 Sheets-Sheet 1

INVENTOR
R. L. TRENT

BY R. B. Ardis

ATTORNEY

DIRECT-CURRENT LEVEL CONTROL IN PULSE TRANSMISSION

Filed March 18, 1957

2 Sheets-Sheet 2

INVENTOR
R. L. TRENT
BY R. B. Ardis
ATTORNEY 2,973,440
Patented Feb. 28, 1961

2,973,440

DIRECT-CURRENT LEVEL CONTROL IN PULSE TRANSMISSION

Robert L. Trent, Pluckemin, N.J., assignor to Bell Telephone Laboratories, Incorporated, New York, N.Y., a corporation of New York Filed Mar. 18, 1957, Ser. No. 646,649

14 Claims. (Cl. 307—88.5)

This invention relates to electrical pulse transmission and in particular to the control, or restoration, of the direct-current level in such transmission.

It is well-known that in transmitting pulses over ordinary transmission paths they may become distorted to the extent that they are unsuitable to effect the desired operation at the receiving end. The distortion may be the result of the frequency characteristics of the paths and the accretion of noise along the paths. In order not to lose the usefulness of the pulses, repeater apparatus has been used in transmission channels to completely restore each individual pulse to its original form or any other desired standard form by regeneration, which completely eliminates the effects of accumulated noise, distortion and attenuation.

Some of the repeater apparatus used for regenerating pulses in transmission paths include input and output transformers both for impedance matching purposes and for separating energizing current from pulse information when direct-current power is supplied to the apparatus over the same paths. Because a transformer input in a repeater presents a discontinuity to the original direct-current reference level of the pulses, a new direct-current reference level is established on the secondary side of the transformer. In the absence of any compensating means, the new direct-current level is related to the intervals between pulses and the amplitudes and durations of the pulses on the secondary side of the transformer. When the pulse train is not uniform, the new reference level varies to produce an effect which is commonly referred to as a "wandering zero." A "wandering zero" may cause the effective amplitudes of the pulses to vary to the extent that some may be inadequate to cause the repeater to regenerate, thereby losing pulses during transmission.

A circuit arrangement which reduces the adverse effect a "wandering zero" has on the operation of a pulse repeater is disclosed in U.S. Patent 2,703,368 to L. R. Wrathall. The technique proposed by Wrathall is a form of quantized feedback and involves feeding back to the primary side of the input transformer of the repeater a portion of the regenerated repeater output pulses so that, on an individual pulse basis, the pulse area below the original direct-current reference level is equal to the pulse area above that level. This technique, if the proper feedback is maintained, results in the transformation of unidirectional input pulses into dipulses which produce a constant direct-current reference level on the secondary side of the input transformer. If the areas of either the original or the feedback pulses vary, however, a "wandering zero" still occurs to some extent. Although this arrangement eliminates a "wandering zero" under ideal conditions, slight changes in the feedback because of variations in the operation of the output pulse generator or slight changes in the original pulses because of changes in the transmission characteristic of the preceding section of the transmission path affect the compensating characteristic of the feedback pulses.

A principal object of the invention is, therefore, to decrease further, in a transformer-coupled pulse repeater, the effect commonly referred to as a "wandering zero."

Another and more particular object is to make the direct-current reference level of a pulse train in a transformer-coupled repeater substantially independent of variations occurring in the incoming train of pulses.

Still another object is to prevent variations occurring in the pulse regenerator portion of the transformer-coupled repeater from affecting the direct-current reference level of a pulse train in the repeater.

In one of its broad aspects, the invention takes the form of a repeater which includes a linear amplifier having a gated feedback circuit and a pulse regenerator for regenerating pulses both for further transmission and for operating the gate in the amplifier feedback circuit. When an input signal to the amplifier attains an amplitude sufficient for the amplifier output to trigger the pulse regenerator, the gate in the feedback circuit is enabled and a transient wave is coupled back in a negative sense to the input of the amplifier. Because the amplifier is linear, the shapes of the feedback waves are related to the shapes of the input signals. When the repeater is transformer-coupled into a transmission path, the new direct-current reference level of the pulse train within the repeater is substantially constant as a result of the compensation produced by the gated linear feedback. Since the regenerated output pulses are used simply as a switching function to enable the gate in the feedback path, variations which may occur in the amplitude and waveshape characteristics of the regenerated pulses do not influence the new-direct reference level.

One of the important features of the invention is the gated feedback circuit provided for the linear amplifier. The gate is normally disabled so that the full forward gain of the amplifier is applied to the input signal for triggering purposes. After the pulse regenerator is triggered, the amplified input signal, which does not have any further influence on the pulse regenerator, is then coupled back to the input of the amplifier to produce the desired compensation for stabilizing the new direct-current reference level.

One preferred embodiment of the invention includes a linear amplifier having a gated negative feedback path. The output of the amplifier is applied to a pulse regenerator which may be similar to the blocking oscillator disclosed in U.S. application, Serial No. 574,865, filed on March 29, 1956 by L. C. Thomas. A portion of the output from the pulse regenerator is coupled to the gate in the amplifier feedback path so that the gate is enabled when a pulse is generated. A resistive network is provided in the feedback path to attenuate the feedback wave to accomplish the desired compensation.

Although the invention is described and illustrated herein with respect to pulse transmission systems, it may, of course, be used in other systems or apparatus such as digital computers where direct-current isolation is important.

Other objects and features of the invention will be apparent from a study of the following detailed description of a specific embodiment. In the drawings.

Figure 1:
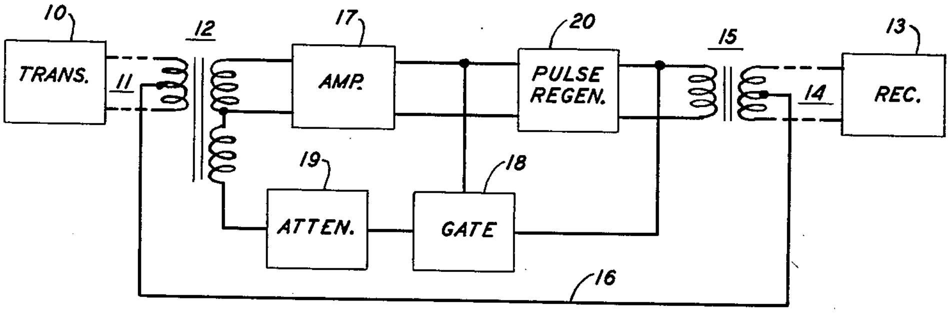
Fig. 1 shows a block diagram illustrating the principles underlying the invention.

Fig. 1 is a block diagram of an arrangement containing a transmission path illustrating the principles underlying the invention. Although a pair of transmission paths are generally used to permit communication in both directions, only one path is shown in order to simplify the drawings. A pulse transmitter 10 is connected by a transmission line 11 to the primary winding of a transformer 12, while a receiver 13 is connected by a second transmission line 14 to the secondary winding of a transformer 15. A lead 16 connected between the center tap of the primary side of transformer 12 and the center tap of the secondary side of transformer 15, in conjunction with a similar arrangement in the mating but unillustrated path, permits energizing direct-current power to be transmitted along the paths to the repeaters. Energizing connections between the illustrated repeater and lead 16 are omitted to simplify further the drawings. Such techniques for energizing repeaters in transmission paths are well-known to those skilled in the art.

Connected to a portion of the secondary winding of transformer 12 is a linear amplifier 17. A feedback path comprising a normally disabled gate 18, an attenuator 19, and the remaining portion of the secondary winding of transformer 12 is provided around amplifier 17. The output of amplifier 17 is applied to a pulse regenerator 20, which in turn has its output applied to both gate 18 for enabling the gate and the primary winding of transformer 15 for transmission down the line 14.

Figure 2A:
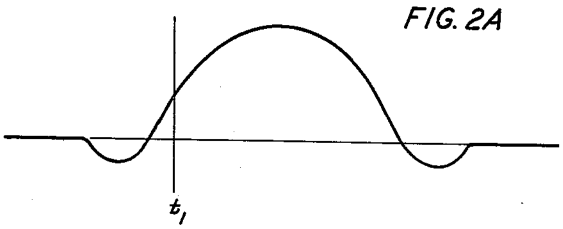
Figs 2A through 2C illustrate waves appearing at various points within the embodiment shown in Fig. 1.
Figure 2B:
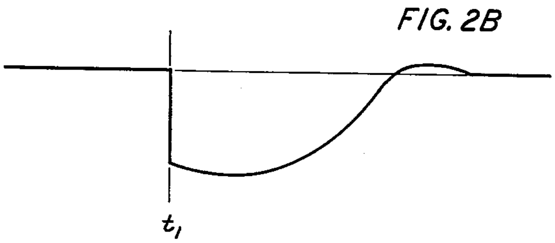
Figure 2C:
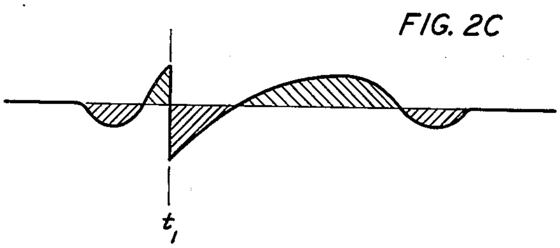

The operation of the arrangement shown in Fig. 1 may be more easily understood by referring to the waveforms shown in Figs. 2A through 2C. Fig. 2A illustrates the shape of a typical pulse applied to the input of a repeater, while Fig. 2B shows the typical shape of the wave coupled back by the feedback path in the arrangement shown in Fig. 1 when a pulse having the configuration shown in Fig. 2A is applied to the primary side of transformer 12. Fig. 2C shows the addition of the pulse of Fig. 2A and the wave of Fig. 2B which is performed in transformer 12 and applied to the input of amplifier 17 of Fig. 1. Prior to the time $t_1$, gate 18 is disabled and no feedback is applied to amplifier 17. The input to amplifier 17 during this period of time comprises the signal applied to the primary winding of transformer 12, as may be appreciated by the shapes of the waves of Figs. 2A and 2C prior to time $t_1$. At time $t_1$ the amplitude of the input pulse is sufficient to cause the amplifier output to trigger pulse regenerator 20. When the regenerator 20 is triggered an output pulse is produced which is coupled into both transmission line 14 and gate 18. When the gate 18 is enabled the output of amplifier 17 is coupled back through an attenuator 19 to the secondary winding of transformer 12 to provide negative feedback. Because the duration of the input pulse is relatively short, a transient condition exists in the loop for the duration of the pulse and consequently the feedback wave is not an exact replica of the input wave to amplifier 17. This is apparent from the waves shown in Figs. 2B and 2C.

The compensation accomplished by the arrangement of Fig. 1 may be appreciated by referring to Fig. 2C in which the wave area above the reference line equals the wave area below the reference line. Because the amplifier 17 is linear, the relation between the transient wave fed back to the input and the input pulse remains the same to provide the desired compensation. Any change, for example, in the amplitude of the input pulse shown in Fig. 2A produces a change in the aforementioned areas of the wave shown in Fig. 2C, but because the amplifier 17 is linear the transient signal coupled back into the input of the amplifier also experiences a change which maintains the balance between the areas above and below the reference line. Thus, variations occurring in the input signal produce variations in the transient feedback wave to maintain the desired compensation in the amplifier input signal. Because the area balance is maintained on a pulse-by-pulse basis, changes in the frequency of the pulses do not introduce any undesirable effect on the compensation. That is, the positive and negative areas of the individual signal inputs to the amplifier 17 cancel one another to maintain the direct-current signal reference level at a zero level on a pulse-by-pulse basis.

It may be found desirable to stretch the output pulses applied to gate 18 in order to maintain the gate in an enabled condition for a period of time in excess of the duration of the regenerated output pulse of pulse regenerator 20. The effects of small variations in the duration of the output pulses from the pulse regenerator 20 may thereby be minimized, since the stretching insures that the output level of the linear amplifier 17 will be close to the zero reference level when the gate 18 is once again disabled. This is an advantage over the quantized feedback system of Wrathall where the amplitude and shape of the output pulses are critical as they, after attenuation, comprise the compensating waves.

Another distinction between the present invention and the quantized system of Wrathall relates to the frequency spectra of the compensating waves. In the quantized system, a modified square wave is used to compensate an input pulse which approaches a gaussian pulse in character. The frequency spectra of a modified square wave contains higher energy components at higher frequencies than the energy components found in a gaussian pulse. In the present invention, the gated linear feedback provides a wave having a frequency spectrum more closely related to that of the input pulse. The similarity between frequency spectra of the input pulse and the compensating wave in the present invention renders the new direct-current reference level more independent of the input pulse pattern than the reference level in the quantized system.

Figure 3:
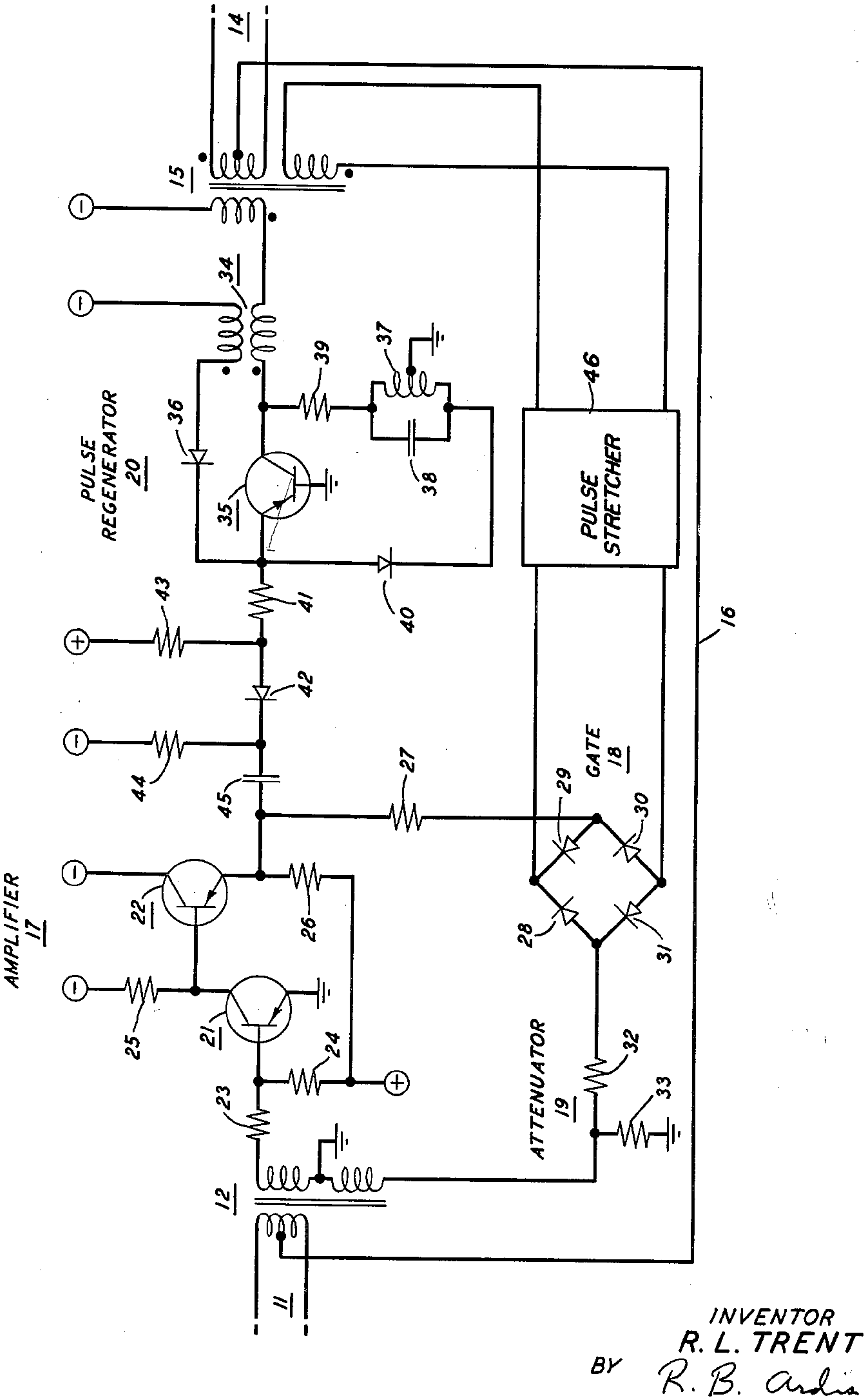
Fig. 3 shows a schematic diagram of one specific embodiment of the invention.

A particular embodiment of the invention is shown in Fig. 3. The linear amplifier 7 of Fig. 1 comprises a conventional two-stage transistor amplifier comprising transistors 21 and 22 and resistors 23 through 26. The input of amplifier 17, one terminal of which is grounded, is connected to a portion of the secondary winding of transformer 12. A resistor 27 connects the ungrounded output terminal of the amplifier 17 to one terminal of a bridge network of diodes 28 through 31 which comprises the gate 18 of Fig. 1. The attenuator 19 of Fig. 1 comprises a pair of serially connected resistors 32 and 33 which are connected between ground and the terminal diagonally opposite the terminal to which resistor 27 is connected. The junction of this resistor network is connected to the remaining extremity of the secondary winding of transformer 12 so that the feedbcak waves are in phase opposition to the input pulses. When a signal of the proper polarity is applied to the remaining terminals of gate 18, the diodes 28 through 31 are forward biased to enable the gate, thereby applying the output of amplifier 17 to the attenuator 19 which in turn applies a portion of the wave to the secondary winding of transformer 12.

The pulse regenerator 20 used in the embodiment in Fig. 3 is similar to one disclosed in the aforementioned application by L. C. Thomas. The primary winding of a transformer 34 is connected between the collector electrode of transistor 35, which has a large signal current gain, and one terminal of the primary winding of transformer 15. The remaining terminal of the primary winding of transformer 15 is connected to ground through a negative source. One terminal of the secondary winding of transformer 34 is connected to ground through a negative source, while the remaining terminal is connected to the emitter electrode of transistor 35 by a diode 36 which is poled so that the direction of easy current flow is toward the emitter. The base electrode of transistor 35 is connected to ground. A tank circuit comprising an inductor 37 and a capacitor 38 has a first terminal connected to the collector of transistor 35 by a resistor 39 and a second terminal connected to the emitter of transistor 35 by a diode 40 which is poled so that the direction of easy current flow is toward the tank circuit. A tap on the inductor 37 is connected to ground. The resonant frequency of the tank circuit is adjusted to coincide with the repetition rate of the input pulse train. The tap on the inductor 37 is positioned so that waves occurring at the tank circuit terminal connected to diode 40, as a result of shock excitation by the regenerator, are delayed substantially 90 degrees with respect to the input pulses. A decoupling resistor 41 is connected between the emitter of the transistor 35 and the output terminal of a diode AND circuit. The AND circuit comprises a diode 42 connected in series between resistors 43 and 44 which have their remaining extremities connected to positive and negative sources, respectively. The diode 42 is poled in a forward bias sense with its cathode and anode electrodes comprising the input and output terminals, respectively, of the AND circuit. A coupling capacitor 45 is connected between the input of the AND circuit and the output of the amplifier 17.

When no signal is applied to the pulse regenerator, a small current flows through resistor 43, the forward biased diode 42 and resistor 44. The effect of this current flow is to maintain a cut-off bias on the emitter of transistor 35 so that the transistor is normally nonconducting. When the first of a series of positive pulses is applied to the AND circuit from the amplifier 17, the diode 42 is back biased, thereby removing the emitter cut-off bias. An emiter-to-base current begins to flow, which in turn causes a rapid increase in the base-to-collector current. The increase in the base-to-collector current induces a voltage in the secondary winding of transformer 34 which forward biases diode 36 and increases the emitter-to-base current. Regeneration thus takes place and the transistor is rapidly driven to saturation, at which time the secondary side of transformer 34 is isolated by diode 36 which is again reverse biased. The change in potential of the collector of transistor 35 results in a shock excitation of the tank circuit comprising inductor 37 and capacitor 38, which produces a train of exponentially decaying sine waves at a frequency equal to the repetition rate of the input pulse train. The tank circuit waves, as they appear on the terminal connected to diode 40, are delayed by 90 degrees from the zero crossings of the input pulses. When the waves from the tank circuit forward bias diode 40, a short-circuiting path parallel to the emitter-base electrodes of the transistor 35 is provided, which diverts the current from the emitter to the short-circuiting path. Cutting off the emitter current causes the transistor 35 to be driven out of its saturation condition to its cut-off condition. When the waves from the tank circuit reverse bias diode 40, the input pulse to the AND circuit no longer exists and the regenerator 20 returns to its quiescent operating condition in which the current flowing through resistors 43 and 44 and diode 42 maintains the transistor 35 in a nonconducting state.

The tank circuit comprising inductor 37 and capacitor 38 is shock excited each time the regenerator 20 produces an output pulse, thereby renewing the decaying sinusoidal oscillation within the tank circuit. The waves produced by the tank circuit are similar in phase to and produce the same effect as the clock signals referred to in the aforementioned application by L. C. Thomas. That is, the regeneration action of regenerator 20 after the tank circuit has been shock excited is identical to the action occurring for the initial pulse, with the exception that the regeneration action is held off by the waves from the tank circuit so the train of output pulses from the regenerator 20 are substantially free of any jitters occurring in the input pulse train.

The changing base-to-collector current flow produced by transistor 35 induces voltages in the secondary windings of transformer 15. One of the secondary windings is connected to line 14 while the other is connected by a pulse stretcher 46 to the gate 18. By proper phasing of connections, a pulse occurring in the secondary windings forward biases the diodes 28 through 31 to enable gate 18. Therefore, referring back to Figs. 2A through 2C, when the amplitude of the input pulse shown in Fig. 2A attains an amplitude sufficient to cause the output of the amplifier 17 to reverse bias diode 42, the pulse regenerator 20 is caused to produce a pulse, a portion of which is coupled back to enable the gate 18. When the gate 18 is enabled, the output of the amplifier 17 is fed back through attenuator 19 to transformer 12 where it is combined with the input pulse in a negative feedback fashion. Pulse stretcher 46 maintains gate 18 in an enabled condition until the output level of amplifier 17 is substantially at the zero reference level. Because amplifier 17 is linear, the shapes of the feedback waves are related to the shapes of the input pulses and substantially perfect compensation is obtained.

Although only one embodiment of the invention has been described in detail, it is to be understood that various other embodiments may be devised by those skilled in the art without departing from the spirit and scope of the invention.

What is claimed is:

1. In combination, an amplifier, an input circuit for said amplifier having a direct-current discontinuity, means for applying signals which may have a variable average value to said input circuit, means for reducing direct-current variation in the input of said amplifier which comprise threshold means responsive to output waves from said amplifier for producing an output only when said amplifier output waves exceed a predetermined threshold value, means responsive to said threshold means output for feeding back to the said input of said amplifier a portion of said amplifier output waves to provide sufficient energy to cancel substantially said direct-current variations, and an output means connected to the output of said threshold means.

2. The combination in accordance with claim 1 wherein said direct-current discontinuity comprises a transformer coupling and wherein said signals comprise a train of pulses.

3. In combination, an amplifier, a transformer connected to the input of said amplifier for applying pulses thereto, threshold means responsive to waves of a predetermined amplitude from said amplifier, said amplifier having a normally disabled negative feedback circuit for applying a portion of said amplifier waves to said amplifier input after said threshold means responds to said waves for substantially equalizing the energy in said pulses on a pulse-by-pulse basis, and an output circuit connected to the output of said threshold means.

4. In combination, a pulse amplifier, means for applying pulses to said amplifier, a pulse regenerator connected to produce a regenerated output pulse in response to output pulses from said amplifier which exceed a predetermined threshold level, and means to feed back a portion of said amplifier output pulses to the input of said amplifier in response to the regenerated output pulses of said pulse regenerator.

5. In combination, a pulse amplifier, a pulse regenerator connected to produce an output pulse of predetermined amplitude and duration whenever the output from said amplifier exceeds a predetermined threshold level, a feedback path around said amplifier which includes a transmission gate for feeding back a portion of said amplifier output, and means to operate said gate in response to the output of said pulse regenerator.

6. A regenerative pulse repeater which comprises a substantially linear amplifier, a pulse regenerator connected to produce an output pulse of predetermined amplitude and duration whenever the output from said amplifier exceeds a predetermined threshold level, an inverse feedback path around said amplifier which includes a normally disabled transmission gate for feeding back a portion of said amplifier output, and means to maintain a substantially constant direct-current level at the input of said amplifier which comprises means to enable said gate for the duration of each output pulse produced by said pulse regenerator.

7. A regenerative pulse repeater which comprises a substantially linear amplifier, an input transformer having its secondary winding connected to supply pulses to the input of said amplifier, an inverse feedback path from the output of said amplifier to the secondary winding of said transformer which includes a normally disabled transmission gate for feeding back a portion of the output from said amplifier output, a pulse regenerator connected to produce an output pulse of predetermined amplitude and duration in response to a rise in the output of said amplifier above a predetermined threshold level, and means to maintain a substantially constant direct-current level on the secondary winding of said transformer which comprises means to enable said gate in response to each output pulse produced by said pulse regenerator.

8. In a transmission system for trains of unidirectional pulses which includes a transmission line carrying direct-current biasing power as well as pulses, a regenerative pulse repeater which comprises a substantially linear amplifier having an input circuit and an output circuit, said amplifier input circuit being connected to receive pulses from said line, means to block direct-current biasing power from said amplifier input circuit, an inverse feedback path from said amplifier output circuit to said amplifier input circuit which includes a normally disabled transmission gate for feeding back a portion of the output from said amplifier, a pulse regenerator connected to said amplifier output circuit to produce an output pulse of predetermined amplitude and duration whenever the signal level in said amplifier output circuit rises above a predetermined threshold level, and means to maintain a substantially constant direct-current level in said amplifier input circuit which comprises means to enable said gate in response to each output pulse produced by said pulse regenerator and attenuating means in said feedback path fixing the feedback level substantially to neutralize the energy in the pulses received by said amplifier input circuit on a pulse-by-pulse basis.

9. A combination in accordance with claim 8 wherein said means blocking direct-current biasing power from said amplifier comprises a transformer.

10. A combination in accordance with claim 8 wherein said means responsive to said pulse regenerator for enabling said gate includes means for maintaining said gate in an enabled condition until each of said input pulses has ceased.

11. In a transmission system for communication by pulses, a series of pulse repeaters for replacing distorted pulses with standardized pulses, each of said repeaters comprising an input element and an output element prohibiting transmission at zero frequency, an amplifier connected to said input element, a pulse regenerator responsive to waves from said amplifier in excess of a predetermined amplitude, means for applying the output of said regenerator to said output element, a normally disabled negative feedback path for applying a portion of said waves from said amplifier to said input element, and means responsive to said regenerator output for enabling said feedback path until each of said distorted pulses applied to said input element has ceased.

12. Apparatus as defined in claim 11 wherein each of said input and output elements comprises a transformer.

13. Apparatus as defined in claim 12 wherein said means responsive to said regenerator output for enabling said feedback path comprises an additional secondary winding on said transformer comprising said output element, a normally disabled gating circuit in series with said feedback path for maintaining said path in a normally disabled condition, and means connecting said additional secondary winding to said gating circuit so that said gating circuit is enabled by said regenerator output pulse.

14. Apparatus in accordance with claim 13 wherein said means connecting said additional secondary winding to said gating circuit comprises a pulse stretcher.

References Cited in the file of this patent

UNITED STATES PATENTS

| | | |
|---|---|---|
| 2,472,209 | Hall | June 7, 1949 |
| 2,480,201 | Selove | Aug. 30, 1949 |
| 2,683,777 | Anderson | July 13, 1954 |
| 2,703,368 | Wrathall | Mar. 1, 1955 |
| 2,710,348 | Baum | June 7, 1955 |
| 2,802,118 | Simkins | Aug. 6, 1957 |
| 2,835,828 | Vogelsong | May 20, 1958 |